US006290175B1

United States Patent
Hart et al.

(10) Patent No.: US 6,290,175 B1
(45) Date of Patent: Sep. 18, 2001

(54) BIN EXTENSION FOR A VEHICLE (75) Inventors: Jack E. Hart, Bellevue; Siulun Tam, Renton; Ralph M. Burrows, Bellingham, all of WA (US)

(73) Assignee: Hexcel Corporation, Pleasanton, CA (US)

( * ) Notice: Subject to any disclaimer, the term of this patent is extended or adjusted under 35 U.S.C. 154(b) by 0 days.

(21) Appl. No.: 09/422,113

(22) Filed: Oct. 20, 1999

(51) Int. Cl.[7] ..................................... B64D 11/00
(52) U.S. Cl. ..................... 244/118.5; 244/118.1
(58) Field of Search ............... 244/118.5, 118.1, 244/119, 117 R, 137.2; 312/246, 266, 269, 205, 265.5, 265.6; 105/315, 321

(56) References Cited

U.S. PATENT DOCUMENTS

| 2,405,643 | * | 8/1946 | Crot . |
|---|---|---|---|
| 3,102,607 | | 9/1963 | Roberts . |
| 4,799,631 | | 1/1989 | Humphries et al. . |
| 4,907,762 | | 3/1990 | Bock et al. . |
| 4,947,762 | | 8/1990 | Perzl et al. . |
| 5,108,048 | | 4/1992 | Chang . |
| 5,129,597 | | 7/1992 | Manthey et al. . |
| 5,395,074 | | 3/1995 | Hart et al. . |
| 5,687,929 | | 11/1997 | Hart et al. . |
| 5,716,027 | * | 2/1998 | Hart et al. . |
| 5,988,565 | * | 11/1999 | Thomas et al. . |

FOREIGN PATENT DOCUMENTS

| 0 279 620 A3 | 8/1988 | (EP) . |
|---|---|---|
| 0 348 130 A2 | 12/1989 | (EP) . |
| WO 90/08674 | 8/1990 | (WO) . |

OTHER PUBLICATIONS

O'Lone, Richard, "Boeing, Proposed New 727, 707 Interior," *Aviation Week*, Apr. 28, 1969, pp. 32–33.

* cited by examiner

Primary Examiner—Charles T. Jordan
Assistant Examiner—Tien Dinh
(74) Attorney, Agent, or Firm—Christensen O'Connor Johnson Kindness PLLC (57) ABSTRACT

An extended luggage bin (20) for a vehicle (24) is provided. The extended luggage bin includes an overhead bin structure (22) located within the vehicle. The overhead bin structure includes a door (32), a shelf (36), first and second bulkheads (34a and 34b), and a bin upper panel (30) having a length and a width. The first and second bulkheads extend between the shelf and the bin upper panel to define a storage space having a volume therebetween. The storage space is accessible through an opening on a frontal side of the extended luggage bin for placing luggage in the storage space. The extended luggage bin also includes a bin extension coupled to the opening of the overhead bin structure. The bin extension includes a bin upper panel extension assembly (50) coupled to the bin upper panel and first and second bulkhead extensions (52a and 52b) extending at least partially between the first and second bulkheads and the door.

37 Claims, 6 Drawing Sheets

BIN EXTENSION FOR A VEHICLE

FIELD OF THE INVENTION

The present invention relates generally to luggage bins used in a vehicle and, more particularly, to an extension kit for increasing the storage volume of the luggage bin.

BACKGROUND OF THE INVENTION

Commercial vehicles capable of transporting passengers, such as airplanes, trains, marine vessels, and buses, often include luggage bins for the storage of passenger carry-on luggage. Typically, overhead luggage bins are fastened within the interior passenger compartment on opposite sides of the vehicle interior. Such luggage bins include an upper bin panel and a shelf held in spaced disposition by a pair of bulkheads to define storage space therebetween. The inboard facing side of the luggage bin includes a hingedly attached door. The storage space is sized to accommodate carry-on luggage, such as appropriately sized travel bags.

In recent years, air travel has become increasingly commonplace for business and short vacation trips. Further, passengers have increasingly tended to travel with larger amounts of carry-on luggage, thereby placing a premium on available overhead luggage bin storage space. Further, because of the increased numbers of passengers using carry-on luggage, airlines have been increasingly enforcing the Federal Aviation Authority (FAA) recommended carry-on size limit. As a result, the traveling public has been using luggage industry standard 22" wheel-equipped carry-on bags in greater numbers. However, in certain airplanes, the overhead luggage bins will only accept the 22" standard roller bags lengthwise within the bin, due to inadequate bin depth and door geometry. Further, because overhead luggage bins are compartmentalized, many overhead luggage bins are sized to accept only one 22" roller bag lengthwise within the overhead bin. Because so many traveling passengers are now adopting the use of these bags, there is a potential for a chronic shortage of bin space to accommodate the passengers. This results in passenger frustration and delays in boarding and unboarding of the vehicle.

Currently, modular extension kits that may be retrofitted onto the inboard-facing section of the overhead luggage bin are available. Typically, such modular kits are completely pre-assembled to standard industrial specifications for a given type of vehicle. The modular kits typically include upper panel, bulkhead, and shelf extensions pre-assembled to predetermined dimensions.

Although such kits are effective at increasing the storage volume within the overhead bin, they are not without their problems. One such problem results from the modular nature of the kit itself. Specifically, modular units built to a pre-set dimensional standard may not fit in an existing luggage cavity as intended because of tolerance variance or component wear. As a result, the kit assembly requires undesirable modifications at the site of installation to properly attach the modular extension to the overhead bin. This results in increased down time for the aircraft.

Thus, there exists a need for a bin extension kit to suit a variety of requirements, that is easy to install, permits a high degree of installation flexibility, and minimizes the down time of the vehicle in which it is being installed.

The assignee has developed other retrofit technologies, e.g., as embodied in U.S. Pat. Nos. 5,395,074 and 5,687,929, the disclosures of which are hereby incorporated by reference.

SUMMARY OF THE INVENTION

In accordance with the present invention, an extended luggage bin for a vehicle is provided. The luggage bin includes a bin structure located in the vehicle. The bin storage area structure includes a door, a shelf, first and second bulkheads and a bin upper panel. The first and second bulkheads extend between the shelf and the bin upper panel to define a storage space having a volume. The storage space is accessible through an opening on a frontal side of the luggage bin for placing luggage in the storage space. The extended luggage bin also includes a bin extension extending at least between the bin upper panel and the door to increase the volume of the storage space, wherein the bin extension includes a bin upper panel extension assembly coupled to the bin upper panel. The existing doors can be reused or new doors can be installed.

In accordance with other aspects of this invention, the bin extension is preferably non-modular, i.e., not wholly pre-assembled, and the bin upper panel extension assembly includes a bracket and a bin upper panel extension portion. However, in alternative embodiments, the inventive extension assembly may also be wholly or partially pre-assembled (i.e., "modular").The bracket has a first end coupled to the bin upper panel and a second end coupled to the bin upper panel extension portion.

In accordance with additional aspects of this invention, the extended luggage bin further includes first and second bulkhead extensions extending at least partially between the first and second bulkheads and the door. Preferably, the first and second bulkhead extensions are coupled to the first and second bulkheads respectively.

In accordance with yet other aspects of this invention, the extended luggage bin further includes a shelf extension assembly coupled to the shelf and extending between the shelf and the door. The shelf extension assembly includes a shelf extension portion and a shelf extension bracket.

In accordance with this invention, the bin upper panel extension assembly and/or the shelf extension assembly increases the volume of the storage space by providing structure whereby the closed position of the bin doors is moved from a first position to a second position to increase the width of the bin upper panel and/or the shelf panel.

An extended luggage bin formed in accordance with the present invention has several advantages over current luggage bin extensions. First, it minimizes the down time of the vehicle due to unanticipated modifications to the bin extension during installation. Also, because the bin extension is preferably non-modular, it may be attached to the existing bin structure without modification of the bin extension. Further, because the bin extension can use the existing door and other components of the existing luggage bin, such an extension is less expensive than those requiring new components. Thus, an extended luggage bin formed in accordance with the present invention is easier to install, and more economical than currently available luggage bin extensions or the installation of new larger bins. These extensions can be installed on both sides or just one side of a vehicle.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
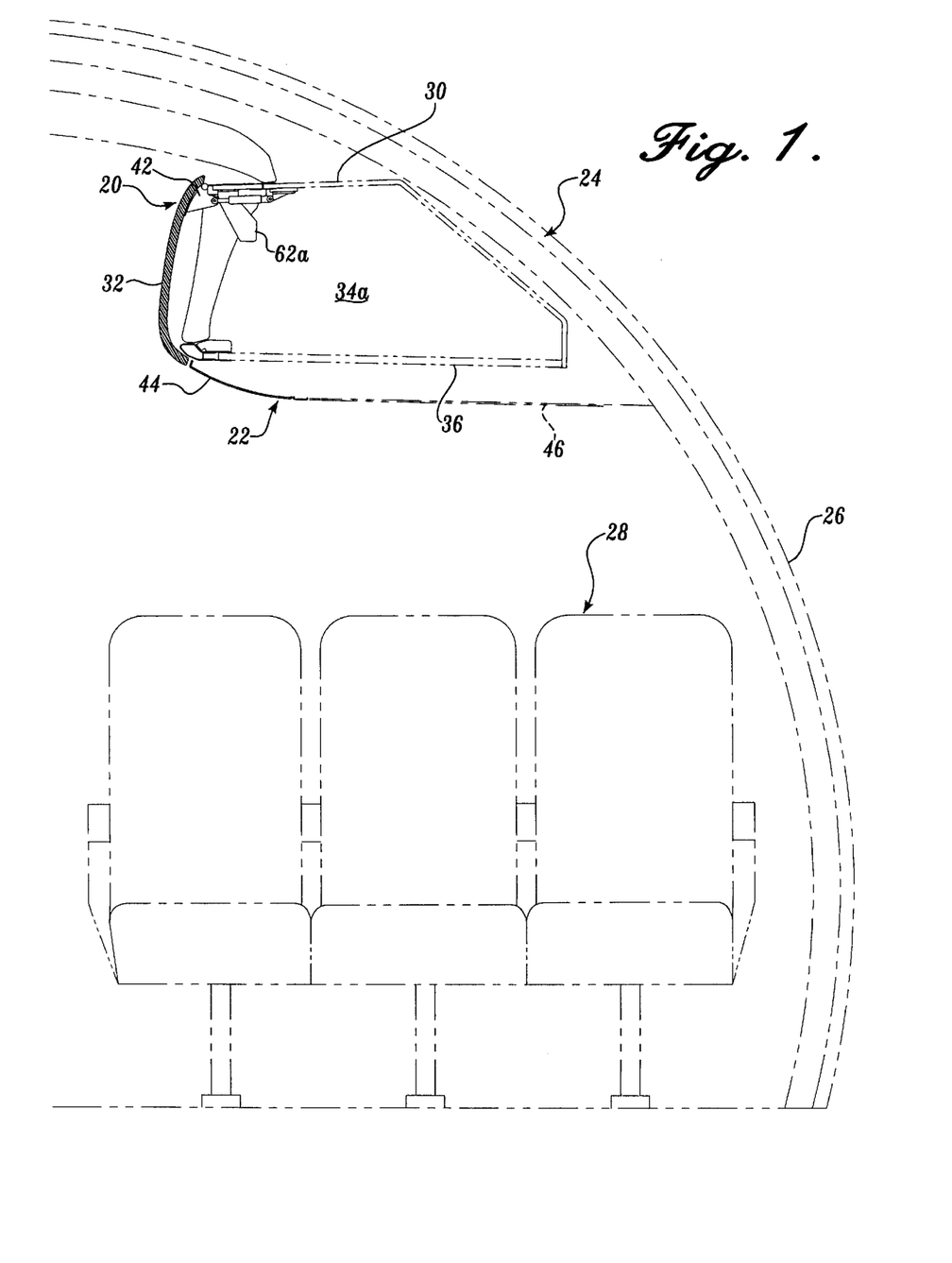
FIG. 1 is an environmental view of an extended luggage bin formed in accordance with the present invention with the extended luggage bin shown in cross section for clarity.
Figure 2:
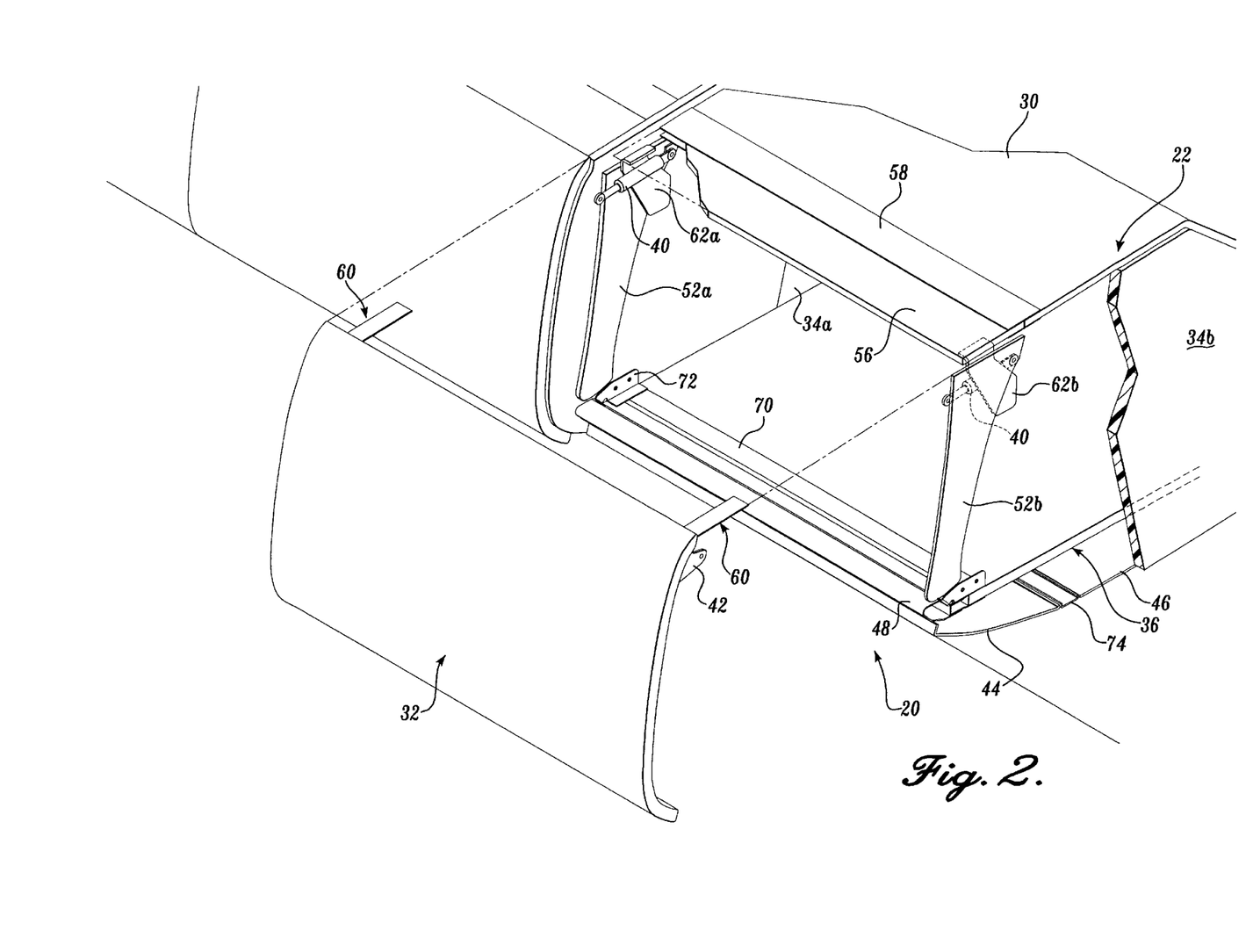
FIG. 2 is a partially-exploded perspective view of an extended luggage bin formed in accordance with the present invention showing the major components of the extension.
Figure 3:
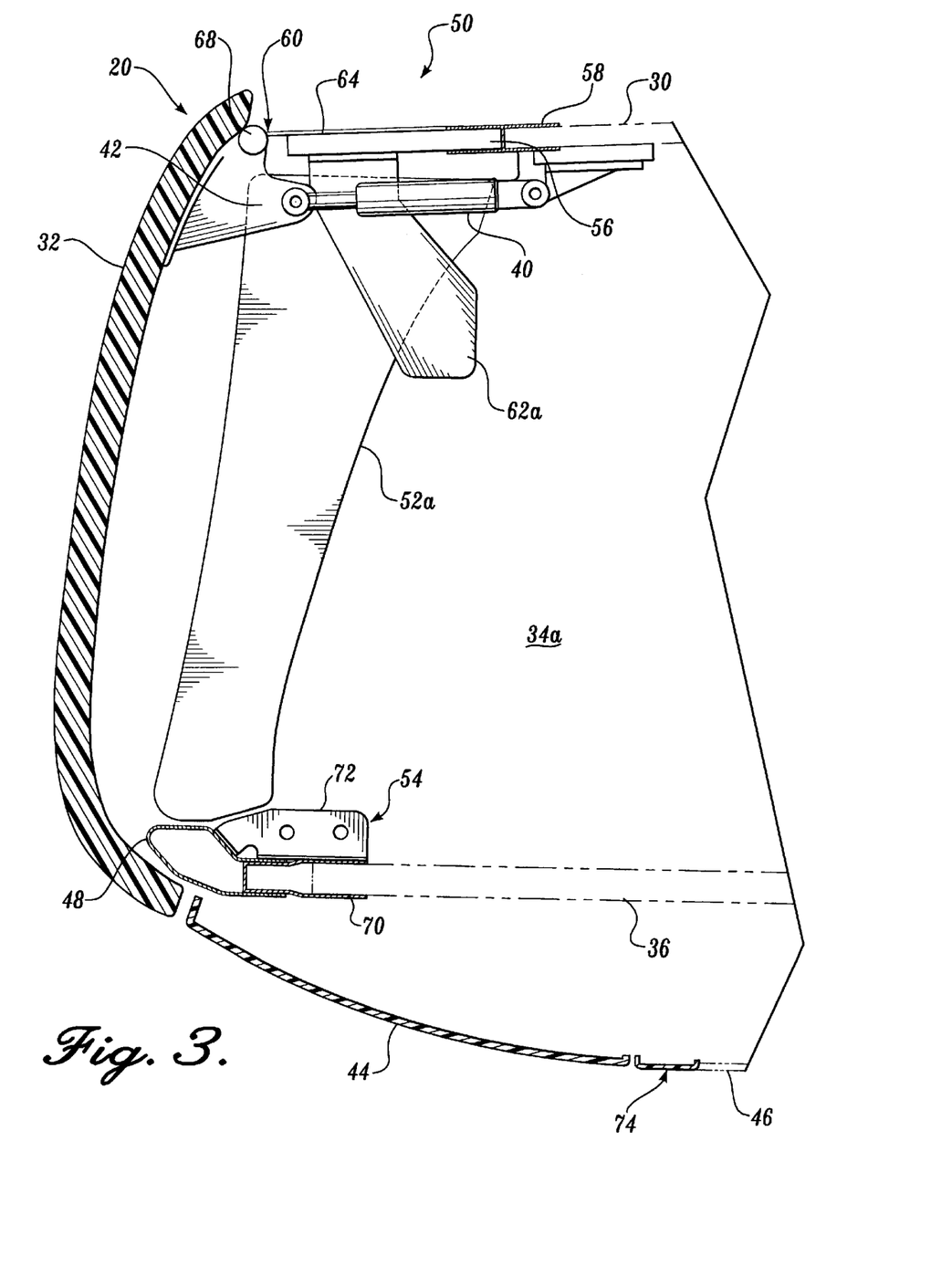
FIG. 3 is a cross-sectional side view of an extended luggage bin formed in accordance with the present invention showing enlarged details of the extensions.

FIGS. 1–3 illustrate a preferred embodiment of a bin extension 20 constructed in accordance with the present invention. The bin extension 20 is illustrated as fastened to an existing overhead luggage bin 22 for a commercial aircraft 24. The aircraft 24 includes a fuselage 26 and a plurality of passenger seats 28. Although the bin extension 20 is illustrated as being attached to an overhead luggage bin 22 for an aircraft 24, it should be apparent that extension assemblies for bins for other types of vehicles, such as buses, boats and trains, are also within the scope of the present invention.

The well-known overhead luggage bin 22 includes a bin upper panel 30, a door 32, first and second bulkheads 34a and 34b, a shelf 36, and a closure assembly. The bin upper panel 30 and the shelf 36 are held in spaced parallel disposition by the first and second bulkheads 34a and 34b to define a substantially rectangular receptacle sized to receive luggage therein.

The door 32 is hingedly attached to the overhead luggage bin 22 by a pair of door hinges 42 and coinciding upper panel hinges 60 which extend from the bin upper panel 30. Hinge spring mechanisms 40 interface with the door hinges 42 to provide door opening following latch operation.

The underside of a typical aircraft stowage bin usually consists of a series of components, including an inboard closure panel 44 and passenger service units 46. To compensate for the shelf extension a new wider closure panel 44 can be installed or the existing one can be re-used by adding a filler panel 74. The filler panel 74 being of similar width to the shelf extension. The passenger service units or other panels outboard of the new closure panel or filler panel 74 remain unaltered.

The shelf 36 includes a bull nose 48 attached to the inboard edge of the shelf 36. The bull nose 48 is typically a longitudinal member that is fastened by well-known fasteners to the inboard facing edge of the shelf 36. The bull nose 48 may be curved upward to assist in restraining luggage stored within the overhead luggage bin 22. The bull nose 48 can be the existing bull nose relocated or a new bull nose.

Referring to FIGS. 2 and 3, the bin extension 20 formed in accordance with the present invention will now be described in greater detail. The bin extension 20 preferably includes a bin upper panel extension assembly 50, first and second bulkhead extensions 52a and 52b, and a shelf extension assembly 54. In an alternative embodiment, the shelf extension assembly 54 may be omitted. The bin upper panel extension assembly 50 includes an upper panel extension 56, an attachment bracket 58, and first and second hinges 60. The upper panel extension 56, depending on the width required, could be a honeycomb panel, sheet metal or suitably formed from a thermoplastic or other type of construction. The upper panel extension 56 is a rectangular member preferably having a length substantially equal to the bin upper panel 30. Alternatively, the upper panel extension 56 need not span the entire width of the bin upper panel 30. The upper panel extension 56 also includes a width. The width may be sized during manufacture of the upper panel extension 52 according to desired increases in the storage volume of the overhead luggage bin 22. The upper panel extension 56 is suitably fastened to the inboard edge of the bin upper panel 30 by the extension attachment bracket 58.

The extension attachment bracket 58 is preferably an elongate rectangularly shaped member having an I-beam cross section. The extension attachment bracket 58 is slidably received on the inboard edge portion of the bin upper panel 30 and is suitably attached to the bin upper panel 30 by well-known fasteners, such as screws. The inboard edge of the bin upper panel 30 is received within one side of the extension attachment bracket 58. The upper panel extension 56 is received in the other side of the extension attachment bracket 58 in an opposed manner relative to the bin upper panel 30, such that the extension attachment bracket 58 couples the upper panel extension 56 to the bin upper panel 30. The upper panel extension 56 may be secured within the extension attachment bracket 58 by well-known fasteners, such as screws. As attached to the bin upper panel 30, the upper panel extension 56 effectively extends the width of the bin upper panel 30 in the inboard direction by an amount substantially equal to at least the width of the upper panel extension 56. Alternate attachment designs, such as upper and lower flat plates, can be used to secure the extension 56 to the upper panel 30.

Although an extension attachment bracket 58 is preferred, it is not required for the invention. As a non-limiting example, the upper panel extension 56 may be located adjacent the bin upper panel 30, but not affixed thereto, but rather secured to first and second bulkheads 34a and 34b by first and second brackets 62a and 62b.

The inboard end of the upper bin extension 56 is preferably supported in the vertical direction by inverted substantially L-shaped first and second bracket 62a and 62b. The upper end of each bracket 62a and 62b is fastened to the underside of the upper panel extension 56 by well-known fasteners, such as screws. The lower ends of each bracket 62a and 62b are suitably fastened to the first and second bulkheads 34a and 34b, respectively, by well-known fasteners, such as screws. The first and second brackets 62a and 62b are positioned beneath the hinges 60 to support loads induced from the bin doors. Also, it should be apparent that depending upon the width of the upper panel extension 56, the first and second brackets 62a and 62b may not be required to support the upper panel extension 56. In this alternate embodiment, the extension attachment bracket 58 is sufficient to retain the extension 56.

Still referring to FIGS. 2 and 3, the first and second bulkhead extensions 52a and 52b will now be described in greater detail. The first and second bulkhead extensions 52a and 52b are substantially U-shaped cross section panels designed at least partially to close out the gap between the inboard edges of the existing bulkheads and the relocated door. Alternatively, as per FIG. 3, it is not necessary that the bulkhead extensions 52a and 52b completely fill this gap. These extensions 52a and 52b can be manufactured from a variety of materials such as honeycomb panels, sheet metal panels, thermoformed or injection molded plastics. They are preferably mechanically attached to the inboard edges of the existing bulkheads 34a and 34b by fasteners or adhesive bonding methods.

As noted above, the bulkhead extension 52a is suitably a panel having a U-shape cross section sized to entrap the inboard edge of the first bulkhead 34a. The bulkhead extensions 52a are also sized to fit between the bin upper panel 30 and the shelf 36. It should be noted that it is not necessary for the lower end of the bulkhead extension 52a to be secured to the shelf 36. Although it is preferred that the lower end of the bulkhead extension remain unattached from the shelf 36, it should be apparent that other configurations, such as mechanically fastening or integrally forming the bulkhead extension with the shelf extension supports, are also within the scope of the present invention. For example, the bulkhead extensions 52a and 52b may be attached to the first and second brackets 62a and 62b, or to the upper panel extensions 56, or to the shelf extension assembly 54, or to any combination thereof. Hence, the bulkhead extensions 52a and 52b need not be connected to the bulkheads 32a and 32b.

The shelf extension assembly 54 includes a shelf extension 70 and a support bracket 72. The elongate shelf extension 70 is substantially U-shaped in cross section. Depending on the size of the extension required, the shelf extension 70 could be made from a honeycomb panel with splice plates, sheet metal formed to shape or other types of construction. The parallel sides of the shelf extension 70 are contoured at the closed end thereof, such that the closed end of the shelf extension 70 is narrower than the open end. The open end of the shelf extension 70 is sized to slidably receive the inboard edge of the shelf 36 therein. The shelf extension 70 may be attached to the shelf 36 by a plurality of well-known fasteners, such as screws or rivets, extending vertically through the shelf extension 70 and into the shelf 36. The inboard end of the shelf extension 70 is sized to be slidably received within the bull nose 48. The bull nose 48 may be attached to the shelf extension 70 by a plurality of well-known fasteners, such as screws or rivets. Additionally, the support bracket 72 may be used to attach the shelf extension 70 and bull nose 48 to the first and second bulkheads 34a and 34b, as described below.

The shelf extension assembly 54 includes two support brackets 72 that are similarly configured. As a result, only one support bracket 72 will be described in greater detail. The support bracket 72 is substantially L-shaped in configuration and the inboard end thereof is contoured at a predetermined angle substantially equal to the upturning end of the bull nose 48. Well known fasteners, such as screws or rivets, attach the support bracket 72 to the bull nose 48. The outboard portion of the support bracket 72 is fastened to the bulkhead 34a or 34b and to the shelf 36 and the shelf extension 70 by well known fasteners extending laterally therethrough. These brackets 72 support typical vertical loads applied to the bull nose 48 and extension 70 during use. Although attaching the bull nose 48 to the shelf extension 70 is preferred, the support bracket 72 may individually support only the shelf extension 70 or the bull nose 48 without supporting the other. In alternative embodiments wherein no shelf extension 70 is employed, the support bracket 72 may be omitted. It should be apparent that depending upon the loads and shelf extension requirements, the bracket 72 may not be necessary to support the extension. As a result, a shelf extension assembly without a bracket is also within the scope of the present invention.

The bin upper panel extension assembly 50, bulkhead extensions 52a and 52b, and shelf extension assembly 54 extends the overhead luggage bin 22 in the 10 inboard direction by a predetermined amount. To accommodate the shelf extension, the underside closure assembly may be modified to include a closure panel extension 74 or a new under closure could be supplied, closure assembly. The width of the closure panel extension 74 is sized to fill the gap created by the shelf extension 70, between the inboard relocated closure panel 44 and the PSU's 46. The closure panel extension 74 extends the length of closure panel 44. As a result, the closure panel extension 74 is adapted to create an aesthetically pleasing exterior for the bin extension 20 within the passenger compartments of the aircraft 24.

To install the bin extension 20, a number of existing overhead luggage bin components are removed before installation of the bin extension 20. In particular, the door 32, hinge spring mechanisms 40, and bull nose 48 are removed from the overhead luggage bin 22. The bin upper panel extension assembly 50 and first and second bulkhead extensions 52a and 52b are attached to the top and two sides of the luggage bin 22, as described above. As also described above, the shelf extension assembly 54 is attached to the existing bin shelf 36. The bull nose 48 is then repositioned inboard from its original position to match the extended bin. The closure panel extension 74 is installed between the inboard closure panels 44 and the PSU's 46. Preferably, the hinge spring mechanisms 40 are merely replaced with hinge spring mechanisms 40 having longer pistons. In this way, the original holes in the bin upper panel 30 or bulkheads 34a and 34b may be reused to attach the hinge spring mechanism 40. In this way, the bulkhead extensions 52a and 52b and upper panel extension 56 are non-structural, that is, do not need to support loads created by door hinges 42. The original door assembly is then reinstalled over the new bin opening, thereby moving the door 32 inboard by a predetermined amount. New doors may be supplied if required.

Alternatively, the hinge spring mechanism 40 may be affixed to the upper panel extension 56, bulkhead extensions 52a and 52b, or first and second brackets 62a and 62b. For example, to speed installation where doors 37 will be replaced, it may be desirable to affix the hinge spring mechanism 40 to the first and second brackets 62a and 62b to facilitate advanced preparedness of the replacement bin assemblies, thereby speeding installation.

Figure 4:
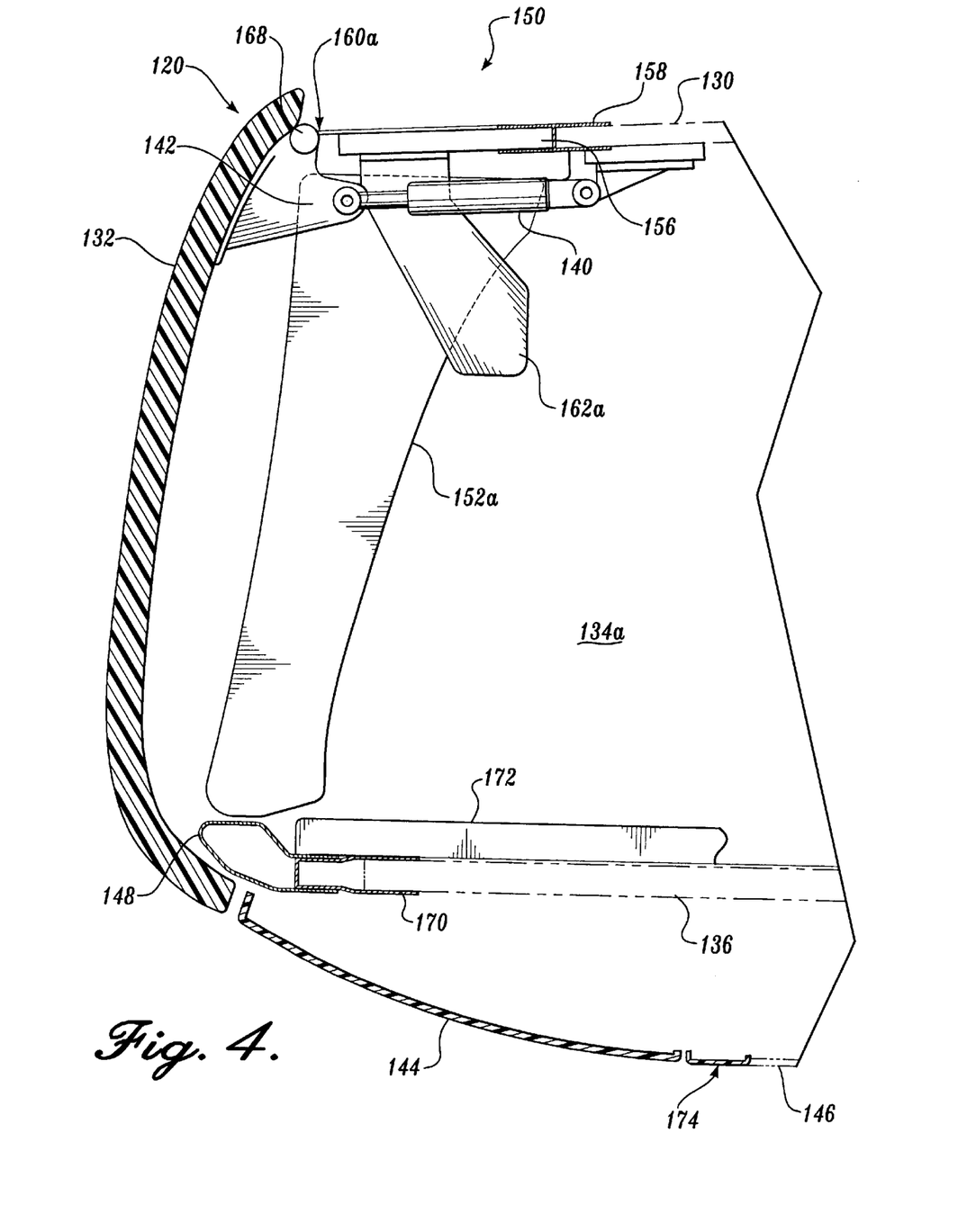
FIG. 4 is a cross-sectional side view of a first alternate embodiment of an extended luggage bin formed in accordance with the present invention.

Referring now to FIG. 4, a first alternate embodiment of a bin extension 120 formed in accordance with the present invention, will now be described in greater detail. The bin extension 120 of the first alternate embodiment is identical in materials and operation to the preferred embodiment described above with the following exception. The support bracket 72 for the shelf extension of the preferred embodiment is replaced with a support beam 172 that is suitably attached to the shelf 136 by well known fasteners, such as screws or rivets. The support beam 172 extends at least a portion of the width of the shelf 136 and the shelf extension 170, thereby attaching the shelf extension 170 to the shelf 136. Alternatively, the support beam 172 may be fastened to the bulkheads 134a and 134b thereby attaching the shelf extension 170 to not only the shelf 136, but also to one of the bulkheads 134a or 134b.

Figure 5:
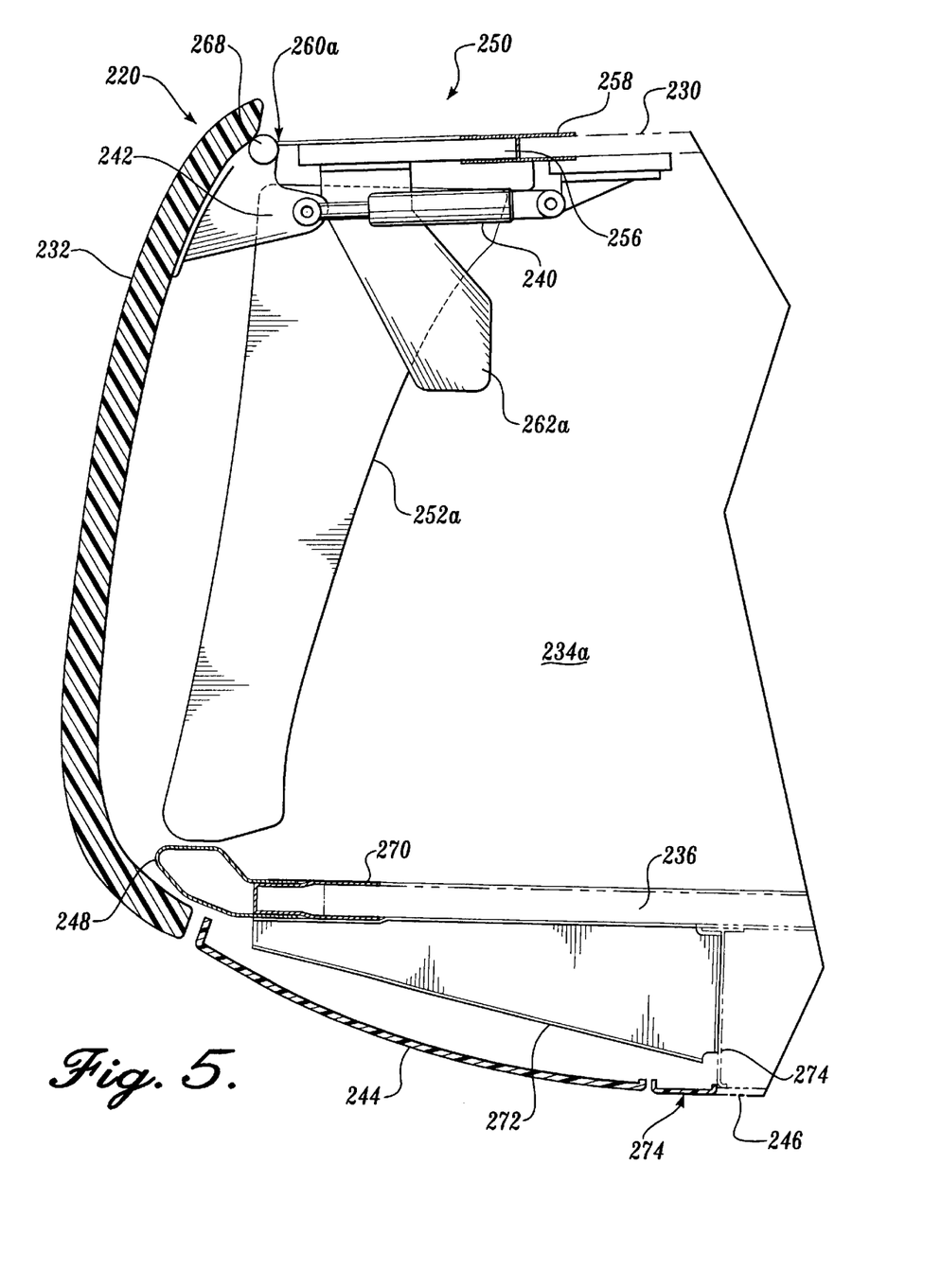
FIG. 5 is a cross-sectional side view of a second alternate embodiment of an extended luggage bin formed in accordance with the present invention.

Referring now to FIG. 5, a second alternate embodiment of a bin extension 220 formed in accordance with the present invention will now be described in greater detail. The bin extension 220 is identical in materials and operation to the preferred embodiment described above, with the following exceptions. The bin shelf extension of the second alternate embodiment includes a support bracket 272 replacing the preferred embodiment support bracket 72. The substantially triangularly shaped support bracket 272 is suitably formed from a light weight high strength material and is fastened to at least the shelf 236, and is preferably also attached to the shelf extension 270 by well known fasteners, such as rivets or screws. The support bracket 272 is suitably fastened beneath the shelf 236 and extends between the shelf extension 270 and at least a portion of the shelf 236 to support the shelf extension 270. Depending upon the load requirements, the support bracket 272 may also be fastened to a support rail 274 extending vertically between the shelf 236 and the PSU 246.

Figure 6:
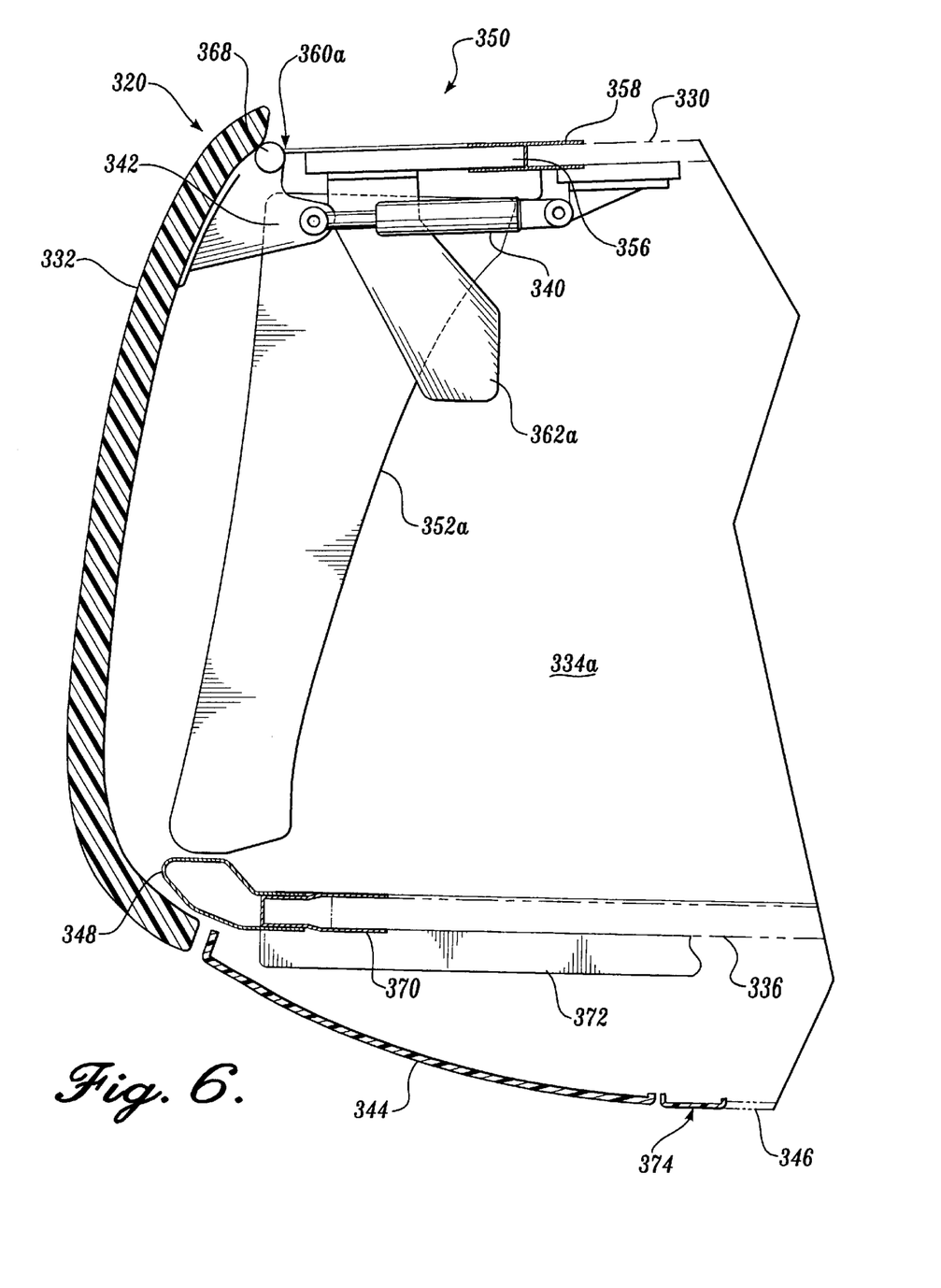
FIG. 6 is a cross-sectional side view of a third alternate embodiment of an extended luggage bin formed in accordance with the present invention.

Referring now to FIG. 6, a third alternative embodiment of a bin extension 320 formed in accordance with the present invention will now be described in greater detail. The bin extension 320 formed in accordance with the present invention is identical in materials and operations to the preferred embodiment described above, with the following exception. In the third alternate embodiment, the bin shelf extension includes a support beam 372 attached to the underside of the shelf 336 and extends between at least a portion of the shelf 336 and the shelf extension 370, thereby replacing the preferred embodiment support bracket 72. The support beam 372 is suitably fastened to the shelf 336 and shelf extension 370 by well known fasteners. The support beam 372 is the size to support the shelf extension 370 in the vertical direction to transfer load associated with use of the luggage bin 22 to the shelf 236.

The previously described version of the present invention provides several advantages over bin extensions currently available in the art. First, because the luggage bin is modified at the site of installation, it minimizes the down time of the aircraft due to unanticipated modifications to the bin extension during installation. Second, because the present bin extension is preferably non-modular, it may be readily attached to the existing bin structure without modification of the bin extension. Further, because the bin extension uses existing components, such as the door and door hinges, of the existing luggage bin, such an extension is less expensive than those requiring new components. Thus, a luggage bin extension formed in accordance with the present invention is easier to install and more economical, than currently available luggage bin extensions.

From the foregoing descriptions, it may be seen that a luggage bin extension formed in accordance with the present invention incorporates many novel features and offers significant advantages over currently available luggage bin extensions. While the presently preferred embodiments of the invention have been illustrated and described, it is to be understood that within the scope of the appended claims, various changes can be made therein without departing from the spirit and scope of the invention. As a non-limiting example, the first and second bulkhead extensions may be integrally formed or mechanically attached to the door. As a second non-limiting example, it should be apparent that the extended luggage bin of the present invention may be used on a single or multiple bin assembly. As a third non-limiting example, as discussed above, the present bin extension mechanism may be used without extending the bin shelf 36, but only extending the bin upper panel extension assembly 50. As a fourth non-limiting example, the present bin extension mechanism may be used in airplanes where it is necessary to modify a portion of the airplane roof or bezel, as well as without modifying the bezel.

The embodiments of the invention in which an exclusive property or privilege is claimed are defined as follows:

1. An extended luggage bin for a vehicle, comprising:
    (a) a bin structure located in a vehicle, the bin structure having a door, a shelf, first and second bulkheads and a bin upper panel having a length and a width, the first and second bulkheads extending between the shelf and bin upper panel to define a storage space having a volume, the storage space accessible through an opening on a frontal side of the extended luggage bin for placing luggage in the storage space;
    (b) a bin extension extending at least between the bin upper panel and the door to increase the volume of the storage space, wherein the bin extension includes a bin upper panel extension assembly located adjacent the bin upper panel; and
    (c) a support bracket connecting the bin upper panel extension assembly to the bin structure.

2. The extended luggage bin of claim 1, wherein the bin extension is non-modular and the bin upper panel extension assembly includes a bracket and a bin upper panel extension portion, the bracket is coupled to the bin upper panel extension portion and to at least one of the bin upper panel and the bulkheads.

3. The extended luggage bin of claim 1, further comprising first and second bulkhead extensions extending at least partially between the first and second bulkheads and the door.

4. The extended luggage bin of claim 3, wherein the bin assembly is non-modular and the bin upper panel extension assembly includes a bracket coupled to the bin upper panel extension assembly and to at least one of the bin upper panel, the bulkhead extensions, and the bulkheads.

5. The extended bin luggage bin of claim 3, wherein the first bulkhead extension is coupled to the first bulkhead and the second bulkhead extension is coupled to the second bulkhead.

6. The extended luggage bin of claim 1, wherein the bin upper panel extension assembly increases the volume of the storage space by moving the door from a first position to a second position to increase at least the width of the bin upper panel.

7. The extended luggage bin of claim 1, further comprising a shelf extension assembly coupled to the shelf.

8. The extended luggage bin of claim 7, wherein the shelf extension assembly includes a shelf extension and a shelf extension bracket, the shelf extension being disposed on the shelf and the shelf extension bracket being attached to one of either the shelf extension or a portion of the shelf.

9. The extended luggage bin of claim 8, wherein the shelf extension bracket is a beam extending between the shelf and shelf extension and is fastened to at least the shelf and shelf extension.

10. The extended luggage bin of claim 7, further comprising a support rail extending vertically from a lower surface of the shelf, wherein the shelf extension bracket extends between the support rail, shelf extension assembly and the shelf to support the shelf extension assembly in a vertical direction.

11. The extended luggage bin of claim 7, wherein the shelf extension assembly includes a shelf extension and a shelf extension bracket, the shelf extension being disposed on the shelf and the shelf extension bracket being attached to the shelf extension and at least one of the shelf, the bulkhead extensions and the bulkheads.

12. A bin extension assembly for use with a luggage bin for a vehicle, the luggage bin having a door, a shelf, first and second bulkheads and a bin upper panel having a length and a width, the first and second bulkheads extending between the shelf and bin upper panel to define a storage space having a volume, the storage space accessible through an opening on a frontal side of the extended luggage bin for placing luggage in the storage space; the bin extension assembly comprising:

a bin extension extending at least between the bin upper panel and the door to increase the volume of the storage space, wherein the bin extension is non-modular and includes a bin upper panel extension assembly located adjacent the bin upper panel.

13. The bin extension assembly of claim 12, wherein the bin upper panel extension assembly includes a bracket and a bin upper panel extension portion, the bracket having a first end coupled to the bin upper panel and a second end coupled to the bin upper panel extension portion.

14. The bin extension assembly of claim 13, further comprising a support bracket connecting the bin upper panel extension portion to at least one of the first and second bulkheads.

15. The bin extension assembly of claim 13, further comprising first and second bulkhead extensions extending at least partially between the first and second bulkheads and the door.

16. The bin extension assembly of claim 15, wherein the first bulkhead extension is coupled to the first bulkhead and the second bulkhead extension is coupled to the second bulkhead.

17. The bin extension assembly of claim 15, further comprising a support bracket connecting the bin upper panel extension portion to at least one of the bin upper panel, and the bulkhead extensions.

18. The bin extension assembly of claim 12, further comprising a support bracket connecting the bin upper panel extension portion to at least one of the first and second bulkheads.

19. The bin extension assembly of claim 12, wherein the bin upper panel extension assembly increases the volume of the storage space by moving the door from a first position to a second position to increase at least the width of the bin upper panel.

20. The bin extension assembly of claim 12, further comprising a shelf extension assembly coupled to the shelf.

21. The bin extension assembly of claim 20, wherein the shelf extension assembly includes a shelf extension and a shelf extension bracket, the shelf extension being disposed on the shelf and the shelf extension bracket being attached to one of either the shelf extension or a portion of the shelf.

22. The bin extension assembly of claim 21, wherein the shelf extension bracket is a beam extending between the shelf and shelf extension and is fastened to at least the shelf and shelf extension.

23. The bin extension assembly of claim 20, further comprising a support rail extending vertically from a lower surface of the shelf, wherein the shelf extension bracket extends between the support rail, shelf extension assembly and the shelf to support the shelf extension assembly in a vertical direction.

24. The bin extension assembly of claim 12, further comprising:
(a) a shelf extension assembly coupled to the shelf;
(b) first and second bulkhead extensions extending at least partially between the first and second bulkheads and the door, wherein the shelf extension assembly includes a shelf extension disposed on the shelf and a shelf extension bracket attached to the shelf extension and to at least one of the shelf, the bulkhead extensions and the bulkheads.

25. An extended luggage bin for a vehicle, comprising:
(a) an overhead bin structure located in a vehicle, the overhead bin structure having a door, a shelf, first and second bulkheads and a bin upper panel having a length and a width, the first and second bulkheads extending between the shelf and bin upper panel to define a storage space having a volume therebetween, the storage space accessible through an opening on a frontal side of the extended luggage bin for placing luggage in the storage space; and
(b) a bin extension coupled to the opening of the overhead bin structure, the bin extension comprises:
(i) a bin upper panel extension assembly located adjacent the bin upper panel; and
(ii) first and second bulkhead extensions extending at least partially between the first and second bulkheads and the door, wherein the bin extension is non-modular and increases the volume of the storage space by moving the door from a first position to a second position to increase at least the width of the bin upper panel.

26. The extended luggage bin of claim 25, wherein the bin extension further comprising a shelf extension assembly coupled to the shelf.

27. The extended luggage bin of claim 26, wherein the shelf extension assembly includes a shelf extension and a shelf extension bracket, the shelf extension being disposed on the shelf and the shelf extension bracket being attached to the shelf extension and at least one of the shelf, the bulkhead extensions and the bulkheads.

28. The extended luggage bin of claim 12, wherein the bin upper panel extension assembly includes a bracket and a bin panel extension portion, the bracket having a first end coupled to the bin upper panel and a second end coupled to the bin upper panel extension portion.

29. The extended luggage of claim 28, further comprising a support bracket connecting the bin panel extension portion to at least one of the first and second bulkheads.

30. The extended luggage of claim 25, further comprising a support bracket connecting the bin panel extension portion to at least one of the first and second bulkheads.

31. In an overhead bin structure located in a vehicle, the overhead bin structure having a door, a shelf, first and second bulkheads, and a bin upper panel having a width, the first and second bulkheads extending between the shelf and the bin upper panel to define a storage space having a volume therebetween, the storage space accessible through an opening on a frontal side of the overhead bin structure, the improvement comprising a non-modular bin extension coupled to the opening, the non-modular bin extension comprising:
(a) a bin upper panel extension assembly located adjacent the bin upper panel;
(b) first and second bulkhead extensions extending at least partially between the first and second bulkheads, respectively, and the door; and
(c) a shelf extension assembly coupled to the shelf and extending between the shelf and the door, wherein the non-modular bin extension increases the volume of the storage space by moving the door from a first position to a second position to increase at least the width of the bin upper panel.

32. The extended luggage bin of claim 31, wherein the shelf extension assembly includes a shelf extension and a shelf extension bracket, the shelf extension being disposed on the shelf and the shelf extension bracket being attached to at least one of either the shelf extension or a portion of the shelf.

33. The extended luggage bin of claim 31, wherein the bin upper panel extension assembly includes a bracket and a bin panel extension portion, the bracket having a first end attached to the bin upper panel extension assembly and a second end attached to the bin upper panel, the bulkhead extensions and the bulkheads.

34. The extended luggage of claim 21, further comprising a support bracket connecting the upper panel extension assembly to at least one of the first and second bulkheads.

35. An extended luggage bin for a vehicle, comprising:
(a) an overhead bin structure located in a vehicle, the overhead bin structure having a door, a shelf, first and second bulkheads and a bin upper panel having a length and a width, the first and second bulkheads extending between the shelf and bin upper panel to define a storage space having a volume therebetween, the storage space accessible through an opening on a frontal side of the extended luggage bin for placing luggage in the storage space;
(b) a bin extension coupled to the opening of the overhead bin structure, the bin extension comprises:
    (i) a bin upper panel extension assembly located adjacent the bin upper panel; and
    (ii) first and second bulkhead extensions extending at least partially between the first and second bulkheads and the door; and
(c) a support bracket connecting the bin panel extension portion to at least one of the first and second bulkheads.

36. An extended luggage bin for a vehicle, comprising:
(a) a bin structure located in a vehicle, the bin structure having a door, a shelf, first and second bulkheads and a bin upper panel having a length and a width, the first and second bulkheads extending between the shelf and bin upper panel to define a storage space having a volume, the storage space accessible through an opening on a frontal side of the extended luggage bin for placing luggage in the storage space;
(b) a bin extension extending at least between the bin upper panel and the door to increase the volume of the storage space, wherein the bin extension includes a bin upper panel extension assembly located adjacent the bin upper panel; and
(c) a shelf extension assembly coupled to the shelf, wherein the shelf extension assembly includes a shelf extension and a shelf extension bracket, the shelf extension being disposed on the shelf and the shelf extension bracket being attached to one of either the shelf extension or a portion of the shelf.

37. The extended luggage bin of claim 36, wherein the shelf extension bracket is a beam extending between the shelf and shelf extension and is fastened to at least the shelf and shelf extension.

* * * * *

UNITED STATES PATENT AND TRADEMARK OFFICE
CERTIFICATE OF CORRECTION

PATENT NO. : 6,290,175 B1  
DATED : September 18, 2001  
INVENTOR(S) : J.E. Hart et al.

It is certified that error appears in the above-identified patent and that said Letters Patent is hereby corrected as shown below:

Column 10,
Line 28, "claim 12," should read -- claim 25, --

Signed and Sealed this

Fourteenth Day of May, 2002

Attest:

Attesting Officer

JAMES E. ROGAN
*Director of the United States Patent and Trademark Office*